United States Patent
Matsumura et al.

(10) Patent No.: US 12,302,121 B2
(45) Date of Patent: May 13, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 330 days.

(21) Appl. No.: 17/789,425

(22) PCT Filed: Jan. 24, 2020

(86) PCT No.: PCT/JP2020/002635
§ 371 (c)(1),
(2) Date: Jun. 27, 2022

(87) PCT Pub. No.: WO2021/149264
PCT Pub. Date: Jul. 29, 2021

(65) Prior Publication Data
US 2023/0058303 A1 Feb. 23, 2023

(51) Int. Cl.
*H04W 16/28* (2009.01)
*H04L 5/00* (2006.01)

(52) U.S. Cl.
CPC .......... *H04W 16/28* (2013.01); *H04L 5/0051* (2013.01)

(58) Field of Classification Search
CPC ...... H04W 16/28; H04L 5/0051; H04L 5/001; H04L 5/0023; H04L 5/0048; H04L 5/0053; H04B 7/0695; H04B 7/06968; H04B 7/0404
See application file for complete search history.

(56) References Cited

U.S. PATENT DOCUMENTS

| | | | |
|---|---|---|---|
| 2021/0159966 A1 | 5/2021 | Xi et al. | |
| 2021/0184738 A1* | 6/2021 | Bai | H04W 52/0206 |
| 2021/0185646 A1* | 6/2021 | Zhou | H04B 7/0404 |
| 2021/0195583 A1* | 6/2021 | Venugopal | H04L 5/0048 |

(Continued)

FOREIGN PATENT DOCUMENTS

| | | | |
|---|---|---|---|
| WO | 2018/232090 A1 | 12/2018 | |
| WO | 2019/195528 A1 | 10/2019 | |

OTHER PUBLICATIONS

Ericsson, "MAC CEs for activating an RS resource and handling corresponding TCI states", 3GPP TSG-RAN WG2 #100, R2-1713533 (Year: 2017).*

(Continued)

*Primary Examiner* — Ayaz R Sheikh
*Assistant Examiner* — Mang Boi Thawng
(74) *Attorney, Agent, or Firm* — Osha Bergman Watanabe & Burton LLP

(57) ABSTRACT

A terminal according to an aspect of the present disclosure includes: a receiving section that receives information indicating a spatial relation between a reference reference signal (RS) and a target RS with respect to uplink (UL) and downlink (DL) transmission configuration indication (TCI) states; and a control section that controls to apply the TCI states to a UL channel and the target RS based on the information. According to the aspect of the present disclosure, appropriate UL transmission can be implemented.

4 Claims, 12 Drawing Sheets

(56) References Cited

U.S. PATENT DOCUMENTS

2021/0195624 A1* 6/2021 Venugopal ............ H04L 5/0094
2022/0330045 A1* 10/2022 He ........................ H04W 16/28
2022/0345272 A1* 10/2022 Guo ...................... H04W 72/20
2022/0417767 A1* 12/2022 Li .......................... H04W 16/28

OTHER PUBLICATIONS

International Search Report issued in PCT/JP2020/002635 on Sep. 1, 2020 (1 page).
Written Opinion of the International Searching Authority issued in PCT/JP2020/002635 on Sep. 1, 2020 (3 pages).
Spreadtrum Communications; "Discussion on multi-beam operation"; 3GPP TSG RAN WG1 #98, R1-1908959; Prague, CZ; Aug. 26-30, 2019 (8 pages).
ZTE; "Enhancements on multi-beam operation"; 3GPP TSG RAN WG1 Meeting #98, R1-1908192; Prague, CZ; Aug. 26-30, 2019 (26 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 20915366.7, mailed on Sep. 7, 2023 (14 pages).
LG Electronics; "Feature lead summary#4 of Enhancements on Multi-beam Operations"; 3GPP TSG RAN WG1 Meeting #98, R1-1909779; Prague, CZ; Aug. 26-30, 2019 (38 pages).
Office Action issued in counterpart Chinese Patent Application No. 202080094233.6 mailed on Jul. 31, 2024 (13 pages).

\* cited by examiner

```
TCI-State ::=              SEQUENCE {
    tci-StateId                TCI-StateId,
    qcl-Type1                  QCL-Info,
    qcl-Type2                  QCL-Info           OPTIONAL,    -- Need R
    ...
}

QCL-Info ::=               SEQUENCE {
    cell                       ServCellIndex      OPTIONAL,    -- Need R
    bwp-Id                     BWP-Id             OPTIONAL,    -- Cond CSI-RS-Indicated
    referenceSignal            CHOICE {
        csi-rs                     NZP-CSI-RS-ResourceId,
        ssb                        SSB-Index
    },
    qcl-Type                   ENUMERATED {typeA, typeB, typeC, typeD},
    ...
}
```

```
PUCCH-SpatialRelationInfo::=      SEQUENCE {
  pucch-SpatialRelationInfoId        PUCCH-SpatialRelationInfoId,
  servingCellId                      ServCellIndex                           OPTIONAL,    -- Need S
  referenceSignal                    CHOICE {
    ssb-Index                          SSB-Index,
    csi-RS-Index                       NZP-CSI-RS-ResourceId,
    srs                                SEQUENCE {
                                         resource          SRS-ResourceId,
                                         uplinkBWP         BWP-Id
                                       }
  },
  pucch-PathlossReferenceRS-Id       PUCCH-PathlossReferenceRS-Id,
  p0-PUCCH-Id                        P0-PUCCH-Id,
  closedLoopIndex                    ENUMERATED { i0, i1 }
}
```

FIG. 2B

```
SRS-SpatialRelationInfo ::=      SEQUENCE {
  servingCellId                      ServCellIndex                           OPTIONAL,    -- Need S
  referenceSignal                    CHOICE {
    ssb-Index                          SSB-Index,
    csi-RS-Index                       NZP-CSI-RS-ResourceId,
    srs                                SEQUENCE {
      resourceId                         SRS-ResourceId,
      uplinkBWP                          BWP-Id
                                       }
  }
}
```

FIG. 5A

```
SpatialRelationInfo-r17    ::=    SEQUENCE {
    spatialRelationInfoId         SpatialRelationInfoIndex
    servingCellId                 ServCellIndex
    referenceSignal               CHOICE {
        ssb-Index                     SSB-Index,
        csi-RS-Index                  NZP-CSI-RS-ResourceId,
        srs                           SEQUENCE {
            resourceId                    SRS-ResourceId,
            uplinkBWP                     BWP-Id
        }
}
```

FIG. 5B

```
SpatialRelationInfo-r17    ::=    SEQUENCE {
    spatialRelationInfoId         SpatialRelationInfoIndex
    servingCellId                 ServCellIndex
    panelId                       PanelIndex
    referenceSignal               CHOICE {
        ssb-Index                     SSB-Index,
        csi-RS-Index                  NZP-CSI-RS-ResourceId,
        srs                           SEQUENCE {
            resourceId                    SRS-ResourceId,
            uplinkBWP                     BWP-Id
        }
}
```

```
UnifiedTciState-r17     ::=         SEQUENCE {
    utci-StateId                    UTCI-StateId,
    qcl-Type1                       QCL-Info,
    qcl-Type2                       QCL-Info
OPTIONAL,       -- Need R
    ...
}

QCL-Info ::=                SEQUENCE {
    cell                            ServCellIndex
OPTIONAL,       -- Need R
    bwp-Id                          BWP-Id
OPTIONAL,       -- Cond CSI-RS-Indicated
    referenceSignal                 CHOICE {
        csi-rs                          NZP-CSI-RS-ResourceId,
        ssb                             SSB-Index,
        srs                             SEQUENCE {
            resourceId                      SRS-ResourceId,
            uplinkBWP                       BWP-Id
        }
    },
    qcl-Type                        ENUMERATED {typeA, typeB, typeC, typeD},
    ...
}
```

FIG. 7

```
UnifiedTciState-r17 ::=          SEQUENCE {
    utci-StateId                 UTCI-StateId,
    qcl-Type1                    QCL-Info,
    qcl-Type2                    QCL-Info
OPTIONAL,    -- Need R
    ...
}

QCL-Info ::=                     SEQUENCE {
    cell                         ServCellIndex
OPTIONAL,    -- Need R
    bwp-Id                       BWP-Id
OPTIONAL,    -- Cond CSI-RS-Indicated
    panelId                      PanelIndex
    referenceSignal              CHOICE {
        csi-rs                       NZP-CSI-RS-ResourceId,
        ssb                          SSB-Index
        srs                          SEQUENCE {
            resourceId                   SRS-ResourceId,
            uplinkBWP                    BWP-Id
        }
    },
    qcl-Type                     ENUMERATED {typeA, typeB, typeC, typeD},
    ...
}
```

FIG. 8

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing a data rate, providing low latency, and the like (see Non Patent Literature 1). Furthermore, the specifications of LTE-Advanced (third generation partnership project (3GPP) Release. (Rel.) 10 to 14) have been drafted for the purpose of further increasing capacity and advancement of LTE (3GPP Rel. 8 and 9).

LTE's successor systems (for example, also referred to as 5th generation mobile communication system (5G), 5G plus (+), New Radio (NR), or 3GPP Rel. 15 or later) have also been studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (for example, NR Rel. 17 or later), as an Uplink (UL) beam indication method for a user terminal (User Equipment (UE)), an Uplink Transmission Configuration Indication state (UL TCI state)) has been studied.

It has not yet been studied how to control a UL beam used by a UE in consideration of the UL TCI state scheduled to be adopted in such a future radio communication system (for example, NR Rel. 17 or later). If this control is not clarified, an increase in communication throughput may be suppressed.

Thus, an object of the present disclosure is to provide a terminal, a radio communication method, and a base station that can perform appropriate UL transmission.

Solution to Problem

A terminal according to an aspect of the present disclosure includes: a receiving section that receives information indicating a spatial relation between a reference reference signal (RS) and a target RS with respect to uplink (UL) and downlink (DL) transmission configuration indication (TCI) states; and a control section that controls to apply the TCI states to a UL channel and the target RS based on the information.

Advantageous Effects of Invention

According to the aspect of the present disclosure, appropriate UL transmission can be implemented.

BRIEF DESCRIPTION OF DRAWINGS

FIG. 1 is a diagram illustrating an example of an information element regarding an existing TCI state.

FIGS. 2A and 2B are diagrams illustrating an example of an information element regarding an existing spatial relation.

FIGS. 5A and 5B are diagrams illustrating an example of a newly defined information element regarding a spatial relation between a reference RS and a target RS.

FIG. 7 is a diagram illustrating an example of the newly defined information element regarding the spatial relation between the reference RS and the target RS.

FIG. 8 is a diagram illustrating an example of the newly defined information element regarding the spatial relation between the reference RS and the target RS.

Figure 3:
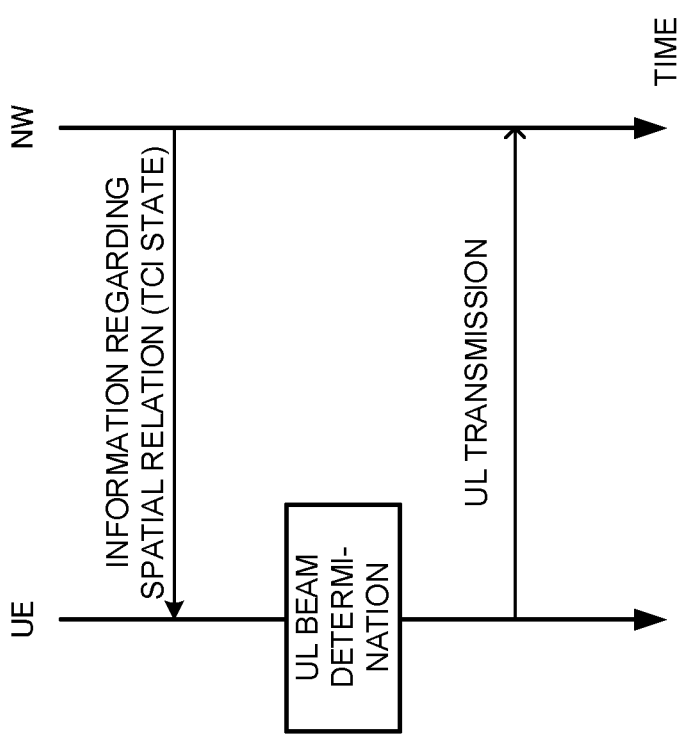
FIG. 3 is a diagram illustrating an example of a UL beam indication method for a UE.

DESCRIPTION OF EMBODIMENTS (TCI, Spatial Relation, and QCL)

In NR, it has been studied that a UE controls reception processing (for example, at least one of reception, demapping, demodulation, or decoding), transmission processing (for example, at least one of transmission, mapping, precoding, modulation, or coding), or the like of at least one of a signal or a channel (which may be referred to as a signal/channel. In the present disclosure, similarly, "A/B" may be read as "at least one of A and B"), based on a Transmission Configuration Indication State (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel, and may also be referred to as, for example, a spatial Rx parameter, spatial relation information, or the like. The TCI state may be configured in the UE for each channel or each signal.

The QCL is an indicator indicating a statistical property of a signal/channel. For example, when one signal/channel and another signal/channel have a QCL relation, this may mean that it is possible to assume that the plurality of different signals/channels have at least one identical property out of Doppler shift, Doppler spread, average delay, delay spread, or spatial parameter (for example, spatial Rx parameter) (a QCL relation is established regarding at least one of these).

Note that, the spatial Rx parameter may correspond to a reception beam of the UE (for example, a reception analog beam), and the beam may be specified based on spatial QCL. The QCL (or at least one element of the QCL) in the present disclosure may be replaced with the spatial QCL (sQCL).

A plurality of types of QCL (QCL types) may be defined. For example, four QCL types A to D with different parameters (or parameter sets) that can be assumed to be identical may be provided. These parameters (may be referred to as QCL parameters) are as follows:

QCL type A (QCL-A): Doppler shift, Doppler spread, average delay, and delay spread;
QCL Type B (QCL-B): Doppler shift and Doppler spread;
QCL type C (QCL-C): Doppler shift and average delay; and
QCL type D (QCL-D): Spatial Rx parameter.

The types A to C may correspond to QCL information associated with synchronization processing of at least one of time or frequency, and the type D may correspond to QCL information associated with beam control.

It may be referred to as a QCL assumption for the UE to assume that a given control resource set (CORESET), channel, or reference signal has a specific QCL (for example, QCL type D) relation with another CORESET, channel, or reference signal.

The UE may determine at least one of a transmission beam (Tx beam) and a reception beam (Rx beam) of a signal/channel based on a TCI state of the signal/channel or the QCL assumption.

The TCI state may be, for example, information regarding QCL of a target channel (or a reference signal (RS) for the channel) and another signal (for example, another downlink reference signal (DL-RS). The TCI state may be configured (indicated) by higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

For the MAC signaling, for example, a MAC Control Element (MAC CE), a MAC Protocol Data Unit (PDU), or the like may be used. The broadcast information may be, for example, a Master Information Block (MIB), a System Information Block (SIB), Remaining Minimum System Information (RMSI), Other System Information (OSI), or the like.

The physical layer signaling may be, for example, Downlink Control Information (DCI).

Note that, a channel/signal to which a TCI state is applied may be referred to as a target channel/RS, simply a target, or the like, and the other signal may be referred to as a reference RS, simply a reference, or the like.

A channel for which a TCI state or spatial relation is configured (specified) may be, for example, at least one of a Physical Downlink Shared Channel (PDSCH), a Physical Downlink Control Channel (PDCCH), a Physical Uplink Shared Channel (PUSCH), and a Physical Uplink Control Channel (PUCCH).

Furthermore, an RS having a QCL relation with the channel may be, for example, at least one of a Synchronization Signal Block (SSB), a Channel State Information Reference Signal (CSI-RS)), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a Primary Synchronization Signal (PSS), a Secondary Synchronization Signal (SSS), or a Physical Broadcast Channel (PBCH). The SSB may be referred to as an SS/PBCH block.

The UE may receive, by higher layer signaling, configuration information (for example, PDSCH-Config, tci-StatesToAddModList) including a list of information elements of the TCI state.

An information element of a TCI state configured by higher layer signaling ("TCI-state IE" of RRC) may include a TCI state ID and one or more pieces of QCL information ("QCL-Info"). The QCL Information may include at least one of information regarding the RS having the QCL relation (RS related information) or information indicating a QCL type (QCL type information). The RS related information may include information such as an index of the RS (for example, an SSB index or a Non-Zero-Power (NZP) CSI-RS resource identifier (ID)), an index of a cell where the RS is located, or an index of a Bandwidth Part (BWP) where the RS is located.

In Rel. 15 NR, both an RS of the QCL type A and an RS of the QCL type D, or only the RS of the QCL type A may be configured for the UE as a TCI state of at least one of the PDCCH or the PDSCH.

When the TRS is set as the RS of the QCL type A, in the TRS, different from a Demodulation Reference Signal (DMRS) of the PDCCH or the PDSCH, it is assumed that the same TRS is periodically transmitted for a long time. The UE can measure the TRS and calculate an average delay, a delay spread, and the like.

In the UE for which the TRS is set as the RS of the QCL type A in the TCI state of the DMRS of the PDCCH or the PDSCH, it can be assumed that parameters (the average delay, the delay spread, and the like) of the QCL type A are the same between the DMRS of the PDCCH or the PDSCH and the TRS, and thus, the parameters (the average delay, the delay spread, and the like) of the type A of the DMRS of the PDCCH or the PDSCH can be obtained from a measurement result of the TRS. When performing channel estimation of at least one of the PDCCH or the PDSCH, the UE can perform channel estimation with higher accuracy using the measurement result of the TRS.

The UE for which the RS of the QCL type D is set can determine a UE reception beam (spatial domain reception filter, UE spatial domain reception filter) by using the RS of the QCL type D.

An RS of a QCL type X of a TCI state may mean an RS in a QCL type X relation with (the DMRS of) a certain channel/signal, and the RS may be referred to as a QCL source of the QCL type X of the TCI state.

FIG. 1 is a diagram illustrating an example of an information element regarding an existing TCI state. By using an information element as indicated in FIG. 1, the UE may receive information regarding the TCI state.

<TCI State for PDCCH>

Information regarding QCL between a PDCCH (or a DMRS antenna port associated with the PDCCH) and a certain RS may be referred to as a TCI state for the PDCCH, or the like.

The UE may determine a TCI state for a UE-specific PDCCH (CORESET) based on higher layer signaling. For example, for the UE, one or a plurality of (K) TCI states may be configured by RRC signaling for each CORESET.

In the UE, one of the plurality of TCI states configured by the RRC signaling may be activated by the MAC CE, for each CORESET. The MAC CE may be referred to as a TCI state indication for UE-specific PDCCH MAC CE. The UE may monitor a CORESET based on an active TCI state corresponding to the CORESET.

<TCI State for PDSCH>

Information regarding QCL between a PDSCH (or a DMRS antenna port associated with the PDSCH) and a certain DL-RS may be referred to as a TCI state for the PDSCH, or the like.

The UE may be notified (configured) of M (M 1) TCI states for PDSCHs (QCL-Info for M PDSCHs) by higher layer signaling. Note that, the number M of TCI states configured in the UE may be limited by at least one of the UE capability or the QCL type.

The DCI used for PDSCH scheduling may include a given field (which may be referred to as, for example, a TCI field, a TCI state field, or the like) indicating a TCI state for the PDSCH. The DCI may be used for PDSCH scheduling of one cell, and may be referred to as, for example, DL DCI, DL assignment, DCI format 1_0, or DCI format 1_1.

Whether or not the TCI field is included in the DCI may be controlled by information provided from a base station to the UE. The information may be information (for example, TCI existence information, in-DCI TCI existence information, a higher layer parameter TCI-PresentInDCI) indicating whether or not the TCI field exists in the DCI. The information may be configured in the UE by, for example, higher layer signaling.

When more than eight types of TCI states are configured in the UE, the MAC CE may be used to activate (or specify) eight or less TCI states. The MAC CE may be referred to as a TCI states activation/deactivation for UE-specific PDSCH MAC CE. A value of the TCI field in the DCI may indicate one of the TCI states activated by the MAC CE.

When the TCI existence information set to "enabled" is configured to a CORESET for scheduling the PDSCH (CORESET used for PDCCH transmission for scheduling the PDSCH) in the UE, the UE may assume that the TCI field exists in the DCI format 1_1 of the PDCCH transmitted on the CORESET.

When the TCI existence information is not set for the CORESET for scheduling the PDSCH, or when the PDSCH is scheduled by the DCI format 1_0, when a time offset between reception of the DL DCI (the DCI for scheduling the PDSCH) and reception of the PDSCH corresponding to the DCI is greater than or equal to a threshold value, the UE, to determine QCL of a PDSCH antenna port, may assume that the TCI state or the QCL assumption for the PDSCH is the same as the TCI state or the QCL assumption applied to the CORESET used for the PDCCH transmission for scheduling the PDSCH.

When the TCI existence information is set to "enabled", when the TCI field in the DCI in a component carrier (CC) in which (the PDSCH) is scheduled indicates the activated TCI state in the scheduled CC or DL BWP, and the PDSCH is scheduled with the DCI format 1_1, the UE, to determine the QCL of the PDSCH antenna port, may use the TCI having the DCI and according to the value of the TCI field in the detected PDCCH. When the time offset between the reception of the DL DCI (for scheduling the PDSCH) and the PDSCH corresponding to the DCI (the PDSCH scheduled by the DCI) is greater than or equal to the threshold value, the UE may assume that a DM-RS port of the PDSCH of a serving cell is the RS and QCL in the TCI state related to a QCL type parameter given by the indicated TCI state.

When a single-slot PDSCH is set in the UE, the indicated TCI state may be based on the activated TCI state in the slot having the scheduled PDSCH. When a multi-slot PDSCH is set in the UE, the indicated TCI state may be based on the activated TCI state in the first slot having the scheduled PDSCH, and the UE may expect that it is the same across the slots having the scheduled PDSCH. When a CORESET associated with a search space set for cross-carrier scheduling is configured in the UE, the TCI existence information is set to "enabled" for the CORESET in the UE, and when at least one of the TCI states configured for the serving cell scheduled by the search space set includes the QCL type D, the UE may assume that a time offset between a detected PDCCH and a PDSCH corresponding to the PDCCH is greater than or equal to a threshold value.

In both a case where in-DCI TCI information (higher layer parameter TCI-PresentInDCI) is set to "enabled" and a case where the in-DCI TCI information is not set in an RRC connection mode, when a time offset between reception of DL DCI (DCI for scheduling a PDSCH) and a corresponding PDSCH (PDSCH scheduled by the DCI) is less than a threshold value, the UE may assume that the DM-RS port of the PDSCH of the serving cell has a lowest CORESET-ID in a latest slot in which one or more CORESETs in an active BWP of the serving cell are monitored by the UE, and is an RS and QCL related to the QCL parameter used for QCL indication of the PDCCH of a CORESET associated with a monitored search space (FIG. 1). The RS may be referred to as a default TCI state of the PDSCH or a default QCL assumption of the PDSCH.

The time offset between the reception of the DL DCI and the reception of the PDSCH corresponding to the DCI may be referred to as a scheduling offset.

Furthermore, the threshold value may be referred to as a QCL time length (time duration), "timeDurationForQCL", "Threshold", "Threshold for offset between a DCI indicating a TCI state and PDSCH scheduled by the DCI", "Threshold-Sched-Offset", a schedule offset threshold value, a scheduling offset threshold value, or the like.

The QCL time length may be based on the UE capability, and may be based on, for example, a delay in decoding and beam switching of the PDCCH. The QCL time length may be a minimum time required for the UE to perform PDCCH reception and application of spatial QCL information received in the DCI for PDSCH processing. The QCL time length may be represented by the number of symbols for each subcarrier interval or may be represented by time (for example, μs). Information of the QCL time length may be reported from the UE to the base station as UE capability information, or may be configured from the base station to the UE by using higher layer signaling.

For example, the UE may assume that the DMRS port of the PDSCH is the DL-RS and QCL based on the TCI state activated for the CORESET corresponding to the lowest CORESET-ID. The latest slot may be, for example, a slot that receives the DCI for scheduling the PDSCH.

Note that, the CORESET-ID may be an ID (ID for identifying the CORESET, controlResourceSetId) set by an RRC information element "ControlResourceSet".

When no CORESET is set for a CC, the default TCI state may be an activated TCI state applicable to the PDSCH in the active DL BWP for the CC and having the lowest ID.

In Rel. 16 or later, when the PDSCH and the PDCCH for scheduling the PDSCH are in different component carriers (CCs) (cross-carrier scheduling), if a delay from the PDCCH to the PDSCH (PDCCH-to-PDSCH delay) is shorter than the QCL time length, or if the TCI state is not in the DCI for the scheduling, the UE may acquire the QCL assumption for the scheduled PDSCH from the active TCI state applicable to the PDSCH in the active BWP of the scheduled cell and having the lowest ID.

<Spatial Relation for PUCCH>

In the UE, a parameter (PUCCH configuration information, PUCCH-Config) used for PUCCH transmission may be set by higher layer signaling (for example, Radio Resource Control (RRC) signaling). The PUCCH configuration information may be configured for each partial band (for example, an uplink Bandwidth Part (BWP)) in a carrier (also referred to as a cell and a Component Carrier (CC)).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list (for example, resourceList) of PUCCH resource indexes (ID, for example, PUCCH-ResourceId).

Furthermore, when the UE does not have a dedicated PUCCH resource configuration information (for example, a dedicated PUCCH resource configuration (dedicated PUCCH resource configuration)) provided by the PUCCH resource set information in the PUCCH configuration information (before RRC setup), the UE may determine a PUCCH resource set based on a parameter (for example, pucch-ResourceCommon) in the system information (for example, System Information Block Type 1 (SIB1) or Remaining Minimum System Information (RMSI)). The PUCCH resource set may include 16 PUCCH resources.

On the other hand, when the UE has the dedicated PUCCH resource configuration information (UE-specific physical uplink control channel configuration, dedicated PUCCH resource configuration) (after RRC setup), the UE may determine the PUCCH resource set in accordance with the number of UCI information bits.

The UE may determine one PUCCH resource (index) in the PUCCH resource set (for example, a cell-specific PUCCH resource set or a PUCCH resource set determined for individual UE) based on at least one of a value of a given field (for example, a PUCCH resource indicator field) in Downlink Control Information (DCI) (for example, the DCI format 1_0 or 1_1 used for PDSCH scheduling), the number of CCEs ($N_{CCE}$) in a control resource set (COntrol REsource SET (CORESET)) for reception of a PDCCH that carries the DCI, or an index ($n_{CCE,\ 0}$) of a head (first) CCE of the reception of the PDCCH.

The PUCCH spatial relation information (for example, "PUCCH-spatialRelationInfo" of the RRC information element) may indicate a plurality of candidate beams (spatial domain filters) for PUCCH transmission. The PUCCH spatial relation information may indicate spatial relating between a Reference Signal (RS) and a PUCCH.

FIG. 2A is a diagram illustrating an example of existing PUCCH spatial relation information. By using the information (for example, the RRC information element) as indicated in FIG. 2A, the UE may receive the PUCCH spatial relation information.

Note that, in the present disclosure, an index, an ID, an indicator, a resource ID, and the like may be replaced with each other.

The list of the PUCCH spatial relation information may include several elements (PUCCH spatial relation information Information Element (IE)). Each piece of the PUCCH spatial relation information may include, for example, at least one of an index (ID, for example, pucch-SpatialRelationInfoId) of the PUCCH spatial relation information, an index (ID, for example, servingCellId) of a serving cell, or information regarding an RS (reference RS) having a spatial relation with the PUCCH.

For example, the information regarding the RS may be an SSB index, a CSI-RS index (for example, an NZP-CSI-RS resource configuration ID), or an SRS resource ID and an ID of the BWP. The SSB index, the CSI-RS index, and the SRS resource ID may be associated with at least one of a beam, a resource, or a port selected by measurement of a corresponding RS.

When more than one piece of the spatial relation information regarding the PUCCH is configured, the UE may control so that one piece of the PUCCH spatial relation information is active with respect to one PUCCH resource at a given time, based on a PUCCH spatial relation Activation/Deactivation MAC CE.

The PUCCH spatial relation Activation/Deactivation MAC CE of Rel. 15 NR is expressed by a total of three Octets (8 bits×3=24 bits) of Octets (Octs) 1-3.

The MAC CE may include information such as an application target serving cell ID ("Serving Cell ID" field), a BWP ID ("BWP ID" field), and a PUCCH resource ID ("PUCCH Resource ID" field).

Furthermore, the MAC CE includes a field of "$S_i$" (i=0-7). When a field of a certain $S_i$ indicates 1, the UE activates the spatial relation information of a spatial relation information ID When a field of a certain $S_i$ indicates 0, the UE deactivates the spatial relation information of the spatial relation information ID #i.

The UE may activate PUCCH relation information specified by a MAC CE 3 ms after transmitting an acknowledgment (ACK) for the MAC CE activating given PUCCH spatial relation information.

<Spatial Relation for SRS and PUSCH>

The UE may receive information (SRS configuration information, for example, a parameter in "SRS-Config" of the RRC control element) used for transmission of a measurement reference signal (for example, a Sounding Reference Signal (SRS)).

Specifically, the UE may receive at least one of information regarding one or a plurality of SRS resource sets (SRS resource set information, for example, "SRS-ResourceSet" of the RRC control element) or information regarding one or a plurality of SRS resources (SRS resource information, for example, "SRS-Resource" of the RRC control element).

One SRS resource set may be associated with a given number of SRS resources (a given number of SRS resources may be grouped). Each SRS resource may be specified by an SRS Resource Indicator (SRI) or an SRS resource Identifier (ID).

The SRS resource set information may include information of an SRS resource set ID (SRS-ResourceSetId), a list of SRS resource IDs (SRS-ResourceId) used in the resource set, an SRS resource type, and usage of the SRS.

Here, the SRS resource type may indicate any of a Periodic SRS (P-SRS), a semi-persistent SRS (SP-SRS), and an Aperiodic SRS (A-SRS, AP-SRS). Note that, the UE may transmit the P-SRS and the SP-SRS periodically (or periodically after activation), and transmit the A-SRS based on an SRS request in the DCI.

Furthermore, the usage ("usage" of an RRC parameter and "SRS-SetUse" of L1 (Layer-1) parameter) may be, for example, beam management (beamManagement), codebook-based transmission (codebook: CB), non-codebook-based transmission (nonCodebook: NCB), antenna switching (antennaSwitching), or the like. An SRS used for the codebook-based transmission or the non-codebook-based transmission may be used to determine a precoder for codebook-based or non-codebook-based PUSCH transmission based on an SRI.

For example, in the case of the codebook-based transmission, the UE may determine the precoder for the PUSCH transmission based on the SRI, a Transmitted Rank Indicator (TRI), and a Transmitted Precoding Matrix Indicator (TPMI). In the case of the non-codebook-based transmission, the UE may determine the precoder for the PUSCH transmission based on the SRI.

The SRS resource information may include the SRS resource ID (SRS-ResourceId), the number of SRS ports, an SRS port number, a transmission Comb, SRS resource mapping (for example, time and/or frequency resource position, resource offset, resource periodicity, the number of repetitions, the number of SRS symbols, SRS bandwidth, and the like), hopping related information, an SRS resource type, a sequence ID, SRS spatial relation information, and the like.

The SRS spatial relation information (for example, "spatialRelationInfo" of the RRC information element) may indicate spatial relation information between a given reference signal and the SRS. The given reference signal may be at least one of a Synchronization Signal/Physical Broadcast Channel (SS/PBCH) block, a Channel State Information Reference Signal (CSI-RS), or an SRS (for example, another SRS). The SS/PBCH block may be referred to as a synchronization signal block (SSB).

FIG. 2B is a diagram illustrating an example of existing SRS spatial relation information. By using the information (for example, the RRC information element) as indicated in FIG. 2B, the UE may receive the SRS spatial relation information.

The SRS spatial relation information may include at least one of an SSB index, a CSI-RS resource ID, or an SRS resource ID as an index of the given reference signal.

Note that, in the present disclosure, an SSB index, an SSB resource ID, and an SSB resource indicator (SSBRI) may be replaced with each other. Furthermore, a CSI-RS index, a CSI-RS resource ID, and a CSI-RS resource indicator (CRI) may be replaced with each other. Furthermore, an SRS index, an SRS resource ID, and an SRI may be replaced with each other.

The SRS spatial relation information may include a serving cell index, a BWP index (BWP ID), and the like corresponding to the given reference signal.

In the NR, transmission of an uplink signal may be controlled based on presence or absence of Beam Correspondence (BC). The BC may be, for example, a capability of a certain node (for example, a base station or UE) to determine a beam (transmission beam, Tx beam) used for signal transmission based on a beam (reception beam, Rx beam) used for signal reception.

Note that, the BC may be referred to as transmission/reception beam correspondence (Tx/Rx beam correspondence), beam reciprocity, beam calibration, Calibrated/Non-calibrated, reciprocity calibrated/non-calibrated, a correspondence degree, a matching degree, or the like.

For example, when there is no BC, the UE may transmit the uplink signal (for example, PUSCH, PUCCH, SRS, and the like) by using the same beam (spatial domain transmission filter) as the SRS (or the SRS resource) indicated from the base station based on measurement results of one or more SRSs (or SRS resources).

On the other hand, when there is the BC, the UE may transmit the uplink signal (for example, PUSCH, PUCCH, SRS, and the like) by using a beam (spatial domain transmission filter) that is the same as or corresponding to a beam (spatial domain reception filter) used to receive a given SSB or CSI-RS (or CSI-RS resource).

When the spatial relation information regarding the SSB or the CSI-RS and the SRS is configured for a certain SRS resource (for example, when there is the BC), the UE may transmit the SRS resource by using the same spatial domain filter (spatial domain transmission filter) as the spatial domain filter (spatial domain reception filter) for receiving the SSB or the CSI-RS. In this case, the UE may assume that a UE reception beam of the SSB or CSI-RS is the same as a UE transmission beam of the SRS.

For a certain SRS (target SRS) resource, when spatial relation information regarding another SRS (reference SRS) and the SRS (target SRS) is configured (for example, when there is no BC), the UE may transmit the target SRS resource by using the same spatial domain filter (spatial domain transmission filter) as a spatial domain filter (spatial domain transmission filter) for transmitting the reference SRS. That is, in this case, the UE may assume that a UE transmission beam of the reference SRS is the same as a UE transmission beam of the target SRS.

The UE may determine a spatial relation of the PUSCH scheduled by DCI based on a value of a given field (for example, the SRS resource identifier (SRI) field) in the DCI (for example, the DCI format 0_1). Specifically, the UE may use spatial relation information (for example, "spatialRelationInfo" of the RRC information element) of the SRS resource determined based on the value (for example, SRI) of the given field for the PUSCH transmission.

When the codebook-based transmission is used for the PUSCH, in the UE, two SRS resources may be set by RRC, and one of the two SRS resources may be indicated by DCI (1-bit given field). When the non-codebook-based transmission is used for the PUSCH, in the UE, four SRS resources may be set by RRC, and one of the four SRS resources may be indicated by DCI (2-bit given field). To use a spatial relation other than the two or four spatial relations set by the RRC, RRC reconfiguration is required.

Note that, the DL-RS can be set for the spatial relation of the SRS resource used for the PUSCH. For example, for the SP-SRS, in the UE, a spatial relation of a plurality of (for example, up to 16) SRS resources can be configured by RRC, and one of the plurality of SRS resources can be indicated by the MAC CE.

<UL TCI State>

In a future radio communication system (for example, NR Rel. 17 or later), as a UL beam indication method, using a UL TCI state has been studied. The UL TCI state is similar to notification of a DL beam (DL TCI state) of the UE. Note that, the DL TCI state may be mutually replaced with a TCI state for a PDCCH/PDSCH.

A channel/signal (which may be referred to as a target channel/RS) for which the UL TCI state is configured (specified) may be, for example, at least one of a PUSCH (DMRS of the PUSCH), a PUCCH (DMRS of the PUCCH), a random access channel (Physical Random Access Channel (PRACH)), an SRS, and the like.

Furthermore, an RS (source RS) having a QCL relation with the channel/signal may be, for example, a DL RS (for example, SSB, CSI-RS, TRS, and the like) or a UL RS (for example, SRS, SRS for beam management, and the like).

In the UL TCI state, the RS having the QCL relation with the channel/signal may be associated with a panel ID for receiving or transmitting the RS. The association may be explicitly configured (or specified) by higher layer signaling (for example, RRC signaling, MAC CE, and the like), or implicitly determined.

A correspondence relationship between the RS and the panel ID may be configured by being included in UL TCI state information, or may be configured by being included in at least one of resource configuration information, spatial relation information, and the like of the RS.

A QCL type indicated by the UL TCI state may be the existing QCL type A-D, or may be another QCL type, or may include a given spatial relation, an associated antenna port (port index), or the like.

For UL transmission, when an associated panel ID is specified (for example, specified by DCI), the UE may perform the UL transmission using a panel corresponding to the panel ID. The panel ID may be associated with the UL TCI state, and when the UL TCI state is specified (or activated) for a given UL channel/signal, the UE may specify the panel used for the UL channel/signal transmission in accordance with the panel ID associated with the UL TCI state.

How to control the UL beam used by the UE in consideration of the UL TCI state scheduled to be adopted in such a future radio communication system has not yet been studied. If this control is not clarified, an increase in communication throughput may be suppressed.

Furthermore, there is also a demand for study of a framework related to a unified QCL configuration applicable to both the DL and the UL.

Thus, the present inventors have conceived a new UL TCI state framework.

Hereinafter, embodiments according to the present disclosure will be described in detail with reference to the drawings. Radio communication methods according to the respective embodiments may be applied independently, or may be applied in combination.

(Radio Communication Method)

The UE may receive newly defined information regarding a spatial relation (or, QCL configuration) between the reference RS and the target RS from a network (NW, for example, gNB).

The UE may determine the UL beam used by the UE based on the newly defined information regarding the spatial relation between the reference RS and the target RS.

For example, as illustrated in FIG. 3, the UE receives, from the NW, the newly defined information regarding the spatial relation (TCI state) between the reference RS and the target RS.

Next, the UE determines the UL beam used by the UE based on the newly defined information regarding the spatial relation (TCI state) between the reference RS and the target RS, and performs UL transmission to the NW.

In the present disclosure, the newly defined information regarding the spatial relation between the reference RS and the target RS may be mutually replaced with information regarding the UL TCI state, information regarding the TCI state unified by the DL and the UL, and the like.

The TCI state may be replaced with a TCI state or a QCL assumption, a QCL assumption, a spatial domain reception filter, a UE spatial domain reception filter, a spatial domain filter, a UE reception beam, a DL reception beam, a DL-RS, or the like. An RS of the QCL type D, a DL-RS associated with the QCL type D, a DL-RS having the QCL type D, a source of the DL-RS, an SSB, and a CSI-RS may be replaced with each other.

In the present disclosure, the TCI state may be information (for example, a DL-RS, a QCL type, a cell in which the DL-RS is transmitted, or the like) regarding a reception beam (spatial domain reception filter) indicated (configured) for the UE. The QCL assumption is based on transmission or reception of an associated signal (for example, PRACH), and may be information (for example, a DL-RS, a QCL type, a cell in which a DL-RS is transmitted, or the like) about a reception beam (spatial domain reception filter) assumed by the UE.

In the present disclosure, the UL TCI state may be mutually replaced with a transmission beam of the UE, a UL beam, a spatial relation of the UL TCI state, a spatial relation, and the like. The UL beam may mean a transmission beam of the PUCCH/PUSCH.

In the present disclosure, "panel ID" may be mutually replaced with a TRP, a panel, a TRP ID, a panel ID, a CORESET group ID for a CORESET of a PDCCH from the TRP or the panel, a CORESET ID indicating the CORESET of the PDCCH from the TRP or the panel, and another index (such as a DMRS port group ID) corresponding to the TRP or the panel.

In the present disclosure, the SRS may be replaced with at least one of the aperiodic SRS (A-SRS), the periodic SRS (P-SRS), or the semi-persistent (SP-SRS).

First Embodiment

In a first embodiment, as a new UL TCI framework, a description will be given of a method for notifying a UE of newly defined information regarding a spatial relation (or, QCL configuration) between a reference RS and a target RS. Furthermore, as the new UL TCI framework, a description will be given of application of the information regarding the spatial relation between the reference RS and the target RS.

Figure 4:
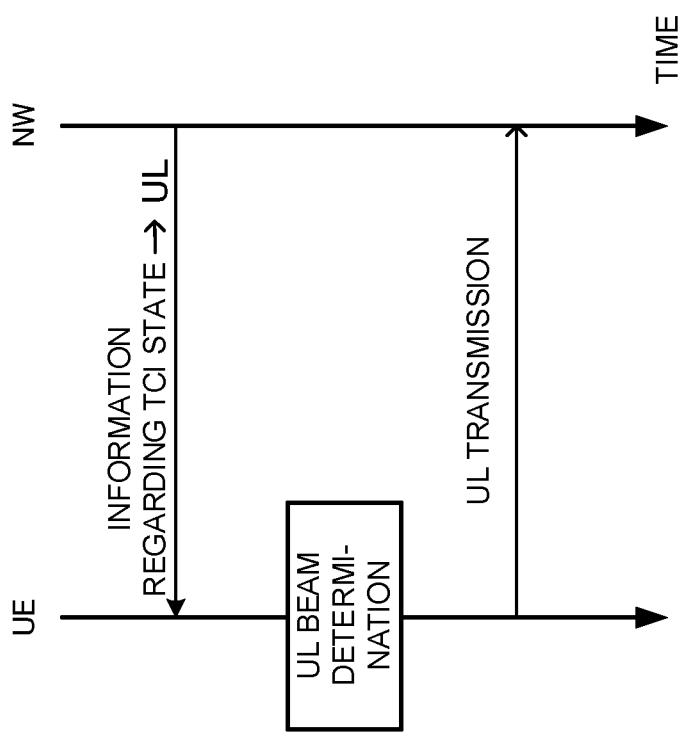
FIG. 4 is a diagram illustrating an example of a UL beam indication method for a UE.

The UE may receive the newly defined information regarding the spatial relation (for example, a UL TCI state) between the reference RS and the target RS. For example, as illustrated in FIG. 4, the UE receives, from a NW, the newly defined information regarding the spatial relation (for example, the UL TCI state) between the reference RS and the target RS.

Next, the UE determines a UL beam used by the UE based on the newly defined information regarding the spatial relation (for example, the UL TCI state) between the reference RS and the target RS, and performs UL transmission to the NW.

The UE may receive the newly defined information regarding the spatial relation (for example, the UL TCI state) between the reference RS and the target RS by at least one of higher layer signaling or physical layer signaling. Furthermore, the UE may receive the information by combining higher layer signaling and physical layer signaling.

The newly defined information regarding the spatial relation between the reference RS and the target RS may be, for example, specific information (for example, spatialRelationInfo-r17) of an RRC information element. The reference RS may be, for example, at least one of an SSB, a CSI-RS, or an SRS. The target RS may be, for example, a UL RS (for example, at least one of the SRS, a PRACH, or a DMRS for demodulating at least one of a PUCCH or a PUSCH).

In a specific information (for example, spatialRelationInfo-r17) element, an index (ID, for example, SpatialRelationInfoId) may be set regarding a certain number (for example, X (X is an integer of greater than or equal to 0)) of pieces of specific information. In the index regarding the certain number (for example, X) of pieces of specific information, a subset of information regarding a certain number (for example, X) of spatial relations may be configured in each target RS (for example, at least one of the SRS, PUCCH-Config, PUSCH-Config, or the PRACH).

In the UE, regarding the newly defined information regarding the spatial relation between the reference RS and the target RS, information regarding the spatial relation for a certain channel/RS (for example, the SRS, the PUCCH, and PUSCH) may be activated/deactivated by a combination of RRC signaling and a MAC CE.

Furthermore, regarding the newly defined information regarding the spatial relation between the reference RS and the target RS, the UE may dynamically receive, by L1 signaling (for example, downlink control information (DCI)), information regarding a spatial relation for a certain channel/RS (for example, an aperiodic SRS, the PUSCH, the PRACH (for example, the PRACH indicated by the PDCCH transmitting the DCI format including a new field), and the PUCCH (for example, the PUCCH indicated by a new field in the DL assignment)).

The UE may receive information regarding the spatial relation (UL TCI state) applied to a specific channel/RS by physical layer signaling (L1 signaling). Information (for example, a resource ID) regarding a resource is configured (indicated) for the specific channel/RS, but different spatial relations may be configured for respective resources. In other words, the UE may assume that a different spatial relation (UL TCI state) is configured for each resource configured for the specific channel/RS.

For example, the information (for example, spatialRelationInfo-r17) regarding the spatial relation between the reference RS and the target RS may be an information element regarding the spatial relation between the reference RS and the target RS as illustrated in FIG. 5A. An index (SpatialRelationInfoId) regarding a certain number (for example, X) of pieces of specific information may be set in the information element of the spatialRelationInfo-r17.

Furthermore, as illustrated in FIG. 5B, information regarding a panel (for example, an ID, an index (panelIndex)) may be configured in the information (for example, spatialRelationInfo-r17) element regarding the spatial relation between the reference RS and the target RS. The information regarding the panel may be at least one of information (UE antenna group ID) regarding a UE antenna group, information (specific RS group ID) regarding a specific RS group, or other similar IDs.

The newly defined information (for example, spatialRelationInfo-r17) regarding the spatial relation between the reference RS and the target RS may be applied to a certain UL channel/RS. For example, the newly defined information (for example, spatialRelationInfo-r17) regarding the spatial relation between the reference RS and the target RS may be applied to all UL channels/RSs. In other words, in the UE, only the newly defined information (for example, spatialRelationInfo-r17) regarding the spatial relation between the reference RS and the target RS may be configured instead of an existing spatial relation.

Furthermore, for example, the newly defined information (for example, spatialRelationInfo-r17) regarding the spatial relation between the reference RS and the target RS may be applied to some UL channels/RSs, and information regarding the existing spatial relation may be applied to remaining UL channels/RSs.

In this case, the newly defined information (for example, spatialRelationInfo-r17) regarding the spatial relation between the reference RS and the target RS and the information regarding the existing spatial relation for different UL channels/RSs may be both configured in the UE. At this time, information regarding one spatial relation may be applied to one UL channel/RS by higher layer signaling (for example, RRC configuration/reconfiguration).

Furthermore, in this case, when one newly defined information (for example, spatialRelationInfo-r17) regarding the spatial relation between the reference RS and the target RS or the information regarding the existing spatial relation is configured for one UL channel/RS, a different spatial relation may be applied during the RRC reconfiguration.

Second Embodiment

In a second embodiment, as a new UL TCI and DL TCI unified framework, a description will be given of a method for notifying a UE of newly defined information regarding a spatial relation (or, QCL configuration) between a reference RS and a target RS. Furthermore, as the new UL TCI and DL TCI unified framework, a description will be given of application of the information regarding the spatial relation between the reference RS and the target RS.

Figure 6:
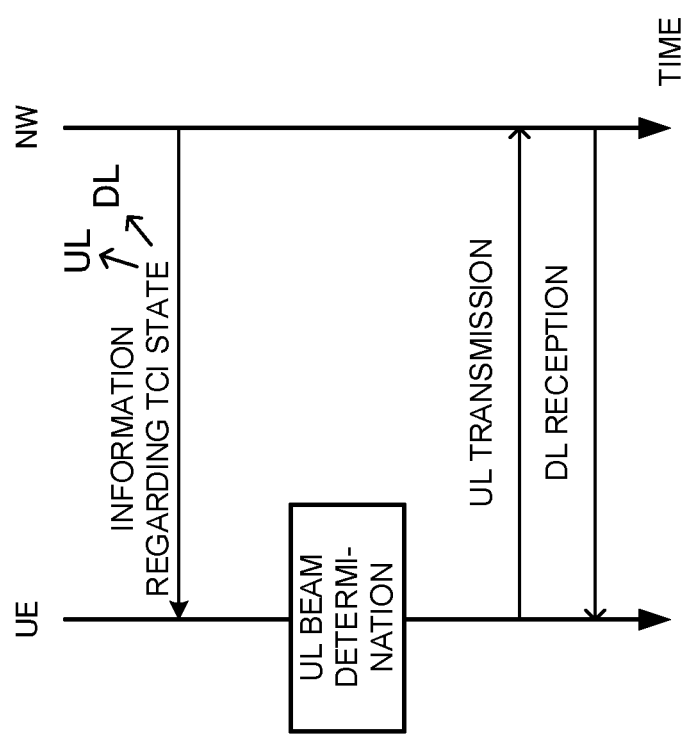
FIG. 6 is a diagram illustrating an example of a UL beam indication method for a UE.

The UE may receive the newly defined information regarding the spatial relation (for example, a TCI state unified to the UL and the DL) between the reference RS and the target RS. For example, as illustrated in FIG. 6, the UE receives, from a NW, the newly defined information regarding the spatial relation (for example, the TCI state unified to the UL and the DL) between the reference RS and the target RS.

Next, the UE determines a UL beam used by the UE based on the newly defined information regarding the spatial relation (for example, the TCI state unified to the UL and the DL) between the reference RS and the target RS, and performs UL transmission to the NW. Furthermore, DL reception from the NW is controlled based on the information. Note that, the number and order of the UL transmission and the DL reception are not limited thereto.

The UE may receive the newly defined information regarding the spatial relation (for example, the TCI state unified to the UL and the DL) between the reference RS and the target RS by at least one of higher layer signaling or physical layer signaling. Furthermore, the UE may receive the information by combining higher layer signaling and physical layer signaling.

The information regarding the spatial relation between the reference RS and the target RS may be, for example, specific information (for example, UnifiedTciState-r17) of an RRC information element. The reference RS may be, for example, at least one of an SSB, a CSI-RS, or an SRS. The target RS may be, for example, a UL RS (for example, at least one of the SRS, a PRACH, or a DMRS for demodulating at least one of a PUCCH or a PUSCH) and a DL RS (for example, at least one of the CSI-RS or a DMRS for demodulating at least one of a PDCCH or a PDSCH).

The specific information (for example, UnifiedTciState-r17) can also be configured (applied) to UEs in which uplink beam management is rarely used.

Note that, the newly defined information (for example, UnifiedTciState-r17) regarding the spatial relation between the reference RS and the target RS may be used only in indication of the UL beam, or may be used in indication of each of the UL beam and a DL beam.

An index (ID, for example, utci-StateID) regarding a certain number (for example, Y (Y is an integer of greater than or equal to 0)) of pieces of specific information may be set in a specific information (for example, UnifiedTciState-r17) element.

In the UE, regarding the newly defined information (for example, UnifiedTciState-r17) regarding the spatial relation between the reference RS and the target RS, information regarding the spatial relation for a certain channel/RS (for example, the PDCCH, the PDSCH, the CSI-RS, the SRS, the PUCCH, the PUSCH) may be activated/deactivated by a combination of RRC signaling and a MAC CE.

Furthermore, regarding the newly defined information (for example, UnifiedTciState-r17) regarding the spatial relation between the reference RS and the target RS, the UE may dynamically receive, by L1 signaling (for example, downlink control information (DCI)), information regarding a spatial relation for a certain channel/RS (for example, an aperiodic CSI-RS, an aperiodic SRS, the PUSCH, the PRACH (for example, the PRACH indicated by the PDCCH transmitting the DCI format including a new field), and the PUCCH (for example, the PUCCH indicated by a new field in the DL assignment)).

The UE may receive information regarding the spatial relation (the TCI state unified to the UL and the DL) applied to a specific channel/RS by physical layer signaling (L1 signaling). Information (for example, a resource ID) regarding a resource is configured (indicated) for the specific channel/RS, but different spatial relations (the TCI state and QCL assumption unified to the UL and the DL) may be configured for respective resources. In other words, the UE may assume that a different spatial relation (the TCI state unified to the UL and the DL) is configured for each resource configured for the specific channel/RS.

For example, the information (for example, UnifiedTciState-r17) regarding the spatial relation between the reference RS and the target RS may be an information element regarding the spatial relation between the reference RS and the target RS as illustrated in FIG. 7. An index (utci-StateID) regarding a certain number (for example, Y) of pieces of specific information may be set in the information element of the UnifiedTciState-r17.

Furthermore, as illustrated in FIG. 8, information regarding a panel (for example, an ID, an index (panelIndex)) may be configured in the information (for example, UnifiedTciState-r17) element regarding the spatial relation between the reference RS and the target RS. The information regarding the panel may be at least one of information (UE antenna group ID) regarding a UE antenna group, information (specific RS group ID) regarding a specific RS group, or other similar IDs.

Note that, in the case of the DL, the newly defined information (for example, UnifiedTciState-r17) element regarding the spatial relation between the reference RS and the target RS can be configured in a DL TCI state for each DL BWP. When information (for example, srs) regarding the SRS is configured in the newly defined information (for example, UnifiedTciState-r17) element regarding the spatial relation between the reference RS and the target RS, it is necessary to configure information (for example, uplinkBWP) regarding a UL BWP to identify the UL BWP corresponding to an SRS resource ID.

Furthermore, in the case of the UL, the newly defined information (for example, UnifiedTciState-r17) element regarding the spatial relation between the reference RS and the target RS can be configured in a UL TCI state for each UL BWP. When information (for example, csi-rs) regarding the CSI-RS or information (for example, ssb) regarding the SSB is configured in the newly defined information (for example, UnifiedTciState-r17) element regarding the spatial relation between the reference RS and the target RS, it is necessary to configure information (for example, downlinkBWP) regarding the DL BWP and identify the DL BWP corresponding to a CSI-RS resource ID or an SSB resource ID.

However, in the existing RRC signaling, in the case of a UL spatial relation configuration, only an ID (BWP-Id) of the information regarding the UL BWP (for example, uplinkBWP) is configured in the information regarding the SRS (for example, srs), and an ID (BWP-Id) of the information regarding the DL BWP (for example, downlinkBWP) is not configured in an information (for example, csi-rs) element regarding the CSI-RS or an information (for example, ssb) element regarding the SSB. For that reason, the ID (BWP-Id) of the information regarding the BWP (for example, uplinkBWP) does not have to be configured.

When the newly defined information (for example, UnifiedTciState-r17) regarding the spatial relation between the reference RS and the target RS is applied, a plurality of pieces of information (for example, qcl-Type) for distinguishing different QCL types for the DL may be applied. In this case, the information for distinguishing the different QCL types applicable to the DL and the UL may be common or different. For example, only a specific QCL type (for example, the QCL type D) may be applied to the UL. As a result, the information for distinguishing the different QCL types applied to the UL can be simplified.

When the newly defined information (for example, UnifiedTciState-r17) regarding the spatial relation between the reference RS and the target RS is applied, a two-stage QCL/TCI configuration may be applied based on the information (for example, UnifiedTciState-r17).

An index (for example, utci-StateID) regarding different specific information is selected for a channel/signal of each of the UL and the DL (first stage), whereby an index (for example, downlink-utci-StateID) regarding the specific information of the DL and an index (for example, uplink-utci-StateID) regarding the specific information of the UL may be individually set (second stage).

An index from 0 to the maximum may be set in each of the index (for example, downlink-utci-StateID) regarding the specific information of the DL and the index (for example, uplink-utci-StateID) regarding the specific information of the UL. The maximum index of the index (for example, downlink-utci-StateID) regarding the specific information of the DL and the index (for example, uplink-utci-StateID) regarding the specific information of the UL may be the same or different.

An index (for example, utci-StateID) regarding specific information that can be selected in common for the index (for example, downlink-utci-StateID) regarding the specific information of the DL and the index (for example, uplink-utci-StateID) regarding the specific information of the UL may be only a specific QCL type (for example, the QCL type D).

Furthermore, the index (for example, utci-StateID) regarding specific information that can be selected in common for the index (for example, downlink-utci-StateID) regarding the specific information of the DL and the index (for example, uplink-utci-StateID) regarding the specific information of the UL may include at least a specific QCL type (for example, the QCL type D). In this case, all QCL types may be applied to the index (for example, downlink-utci-StateID) regarding the specific information of the DL, and only the specific QCL type (for example, the QCL type D) may be applied to the index (for example, uplink-utci-StateID) regarding the specific information of the UL.

The newly defined information (for example, UnifiedTciState-r17) regarding the spatial relation between the reference RS and the target RS may be applied to certain DL and UL channels/RSs. For example, the newly defined information (for example, UnifiedTciState-r17) regarding the spatial relation between the reference RS and the target RS may be applied to all DL and UL channels/RSs. In other words, in the UE, only the newly defined information (For example, UnifiedTciState-r17) regarding the spatial relation between the reference RS and the target RS may be configured instead of the existing TCI state and spatial relation. At this time, the UE may assume that the newly defined information (for example, UnifiedTciState-r17) regarding the spatial relation between the reference RS and the target RS is applied to all the DL and UL channels/RSs.

Furthermore, for example, the newly defined information (for example, spatialRelationInfo-r17) regarding the spatial relation between the reference RS and the target RS may be applied to some DL and UL channels/RSs, and information regarding the existing TCI state or spatial relation may be applied to remaining DL and UL channels/RSs. At this time, the UE may assume that the newly defined information (for example, UnifiedTciState-r17) regarding the spatial relation between the reference RS and the target RS is applied to specific DL and UL channels/RSs, and the information regarding the existing spatial relation is applied to remaining DL and UL channels/RSs.

Furthermore, for example, the newly defined information (for example, spatialRelationInfo-r17) regarding the spatial relation between the reference RS and the target RS may be applied to some resources used for DL and UL channels/RSs may be applied, and information regarding the existing TCI state or spatial relation may be applied to remaining resources used for DL and UL channels/RSs. At this time, the UE may assume that the newly defined information (for example, UnifiedTciState-r17) regarding the spatial relation between the reference RS and the target RS is applied to some resources used for DL and UL channels/RSs, and the information regarding the existing spatial relation is applied to remaining resources used for DL and UL channels/RSs.

Furthermore, for example, the newly defined information (for example, spatialRelationInfo-r17) regarding the spatial relation between the reference RS and the target RS may be applied to some resource sets used for the DL and UL channels/RSs, and the information regarding the existing TCI state or spatial relation may be applied to the remaining resource sets used for the DL and UL channels/RSs. At this time, the UE may assume that the newly defined information (for example, UnifiedTciState-r17) regarding the spatial relation between the reference RS and the target RS is applied to some resource sets used for DL and UL channels/RSs, and the information regarding the existing spatial relation is applied to remaining resource sets used for DL and UL channels/RSs.

(Radio Communication System)

Hereinafter, a configuration will be described of a radio communication system according to an embodiment of the present disclosure. In this radio communication system, communication is performed using one or a combination of the radio communication methods according to the embodiments of the present disclosure.

Figure 9:
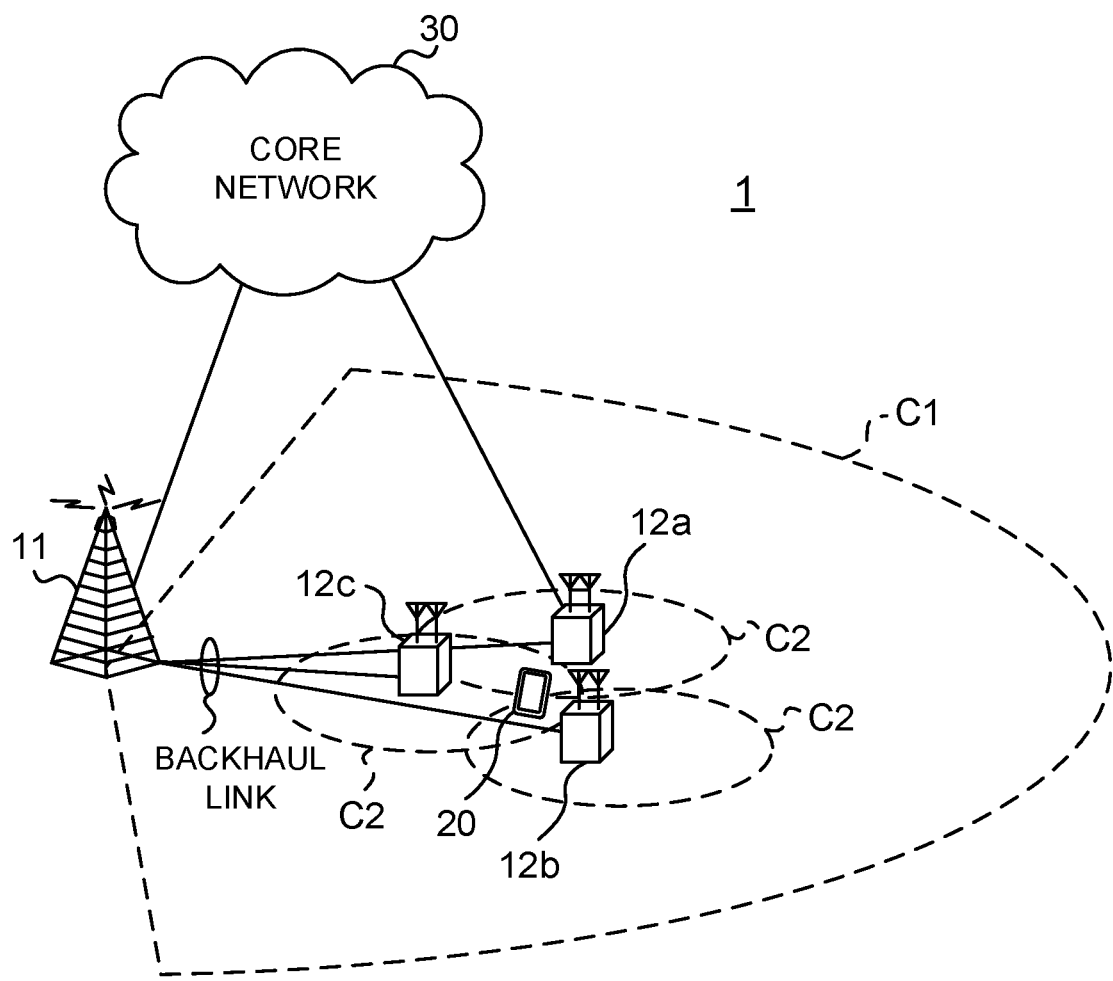
FIG. 9 is a diagram illustrating an example of a schematic configuration of a radio communication system according to an embodiment.

FIG. 9 is a diagram illustrating an example of a schematic configuration of the radio communication system according to the embodiment. A radio communication system 1 may be a system that implements communication using long term evolution (LTE), 5th generation mobile communication system New Radio (5G NR), and the like drafted as the specification by third generation partnership project (3GPP).

Furthermore, the radio communication system 1 may support dual connectivity (multi-RAT dual connectivity (MR-DC)) between a plurality of radio access technologies (RATs). The MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be located in at least one cell. The arrangement, number, and the like of cells and the user terminals 20 are not limited to the aspect illustrated in the drawing. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of Carrier Aggregation (CA) and Dual Connectivity (DC) using a plurality of Component Carriers (CC).

Each CC may be included in at least one of a Frequency Range 1 (FR1) or a Frequency Range 2 (FR2). The macro cell C1 may be included in the FR1, and the small cell C2 may be included in the FR2. For example, the FR1 may be a frequency range of 6 GHz or less (sub-6 GHz), and the FR2 may be a frequency range higher than 24 GHz (above-24 GHz). Note that, the frequency ranges, definitions, and the like of the FR1 and FR2 are not limited to these, and for example, the FR1 may be a frequency range higher than the FR2.

Furthermore, the user terminal 20 may perform communication in each CC by using at least one of Time Division Duplex (TDD) or Frequency Division Duplex (FDD).

The plurality of base stations 10 may be connected to each other by wire (for example, an optical fiber or an X2 interface, or the like in compliance with Common Public Radio Interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal corresponding to at least one of communication methods such as LTE, LTE-A, and 5G.

In the radio communication system 1, an Orthogonal Frequency Division Multiplexing (OFDM)-based radio access method may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, as a downlink channel, a physical downlink shared channel (PDSCH) shared by the user terminals 20, a physical broadcast channel (PBCH), a physical downlink control channel (PDCCH), or the like may be used.

Furthermore, in the radio communication system 1, as an uplink channel, a Physical Uplink Shared Channel (PUSCH) shared by the user terminals 20, a Physical Uplink Control Channel (PUCCH), a Physical Random Access Channel (PRACH), or the like may be used.

User data, higher layer control information, a system information block (SIB), and the like are transmitted by the PDSCH. User data, higher layer control information, and the like may be transmitted by the PUSCH. Furthermore, a Master Information Block (MIB) may be transmitted by the PBCH.

Lower layer control information may be transmitted by the PDCCH. The lower layer control information may include, for example, downlink control information (DCI) including scheduling information of at least one of the PDSCH and the PUSCH.

Note that, the DCI that schedules the PDSCH may be referred to as DL assignment, DL DCI, and the like, and the DCI that schedules the PUSCH may be referred to as UL grant, UL DCI, and the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or a plurality of search spaces. The UE may monitor the CORESET associated with a certain search space based on search space configuration.

One search space may correspond to a PDCCH candidate corresponding to one or a plurality of aggregation levels. One or a plurality of search spaces may be referred to as a search space set. Note that, "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), and the like may be transmitted by the PUCCH. A random access preamble for establishing a connection with a cell may be transmitted by the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be referred to as an SS/PBCH block, an SSB (SS Block), and the like. Note that, the SS, the SSB, or the like may also be referred to as a reference signal.

Furthermore, in the radio communication system 1, a measurement reference signal (Sounding Reference Signal (SRS)), a demodulation reference signal (DMRS), and the like may be transmitted as an uplink reference signal (UL-RS). Note that, the DMRS may be referred to as a user terminal-specific reference signal (UE-specific Reference Signal).

(Base Station)

Figure 10:
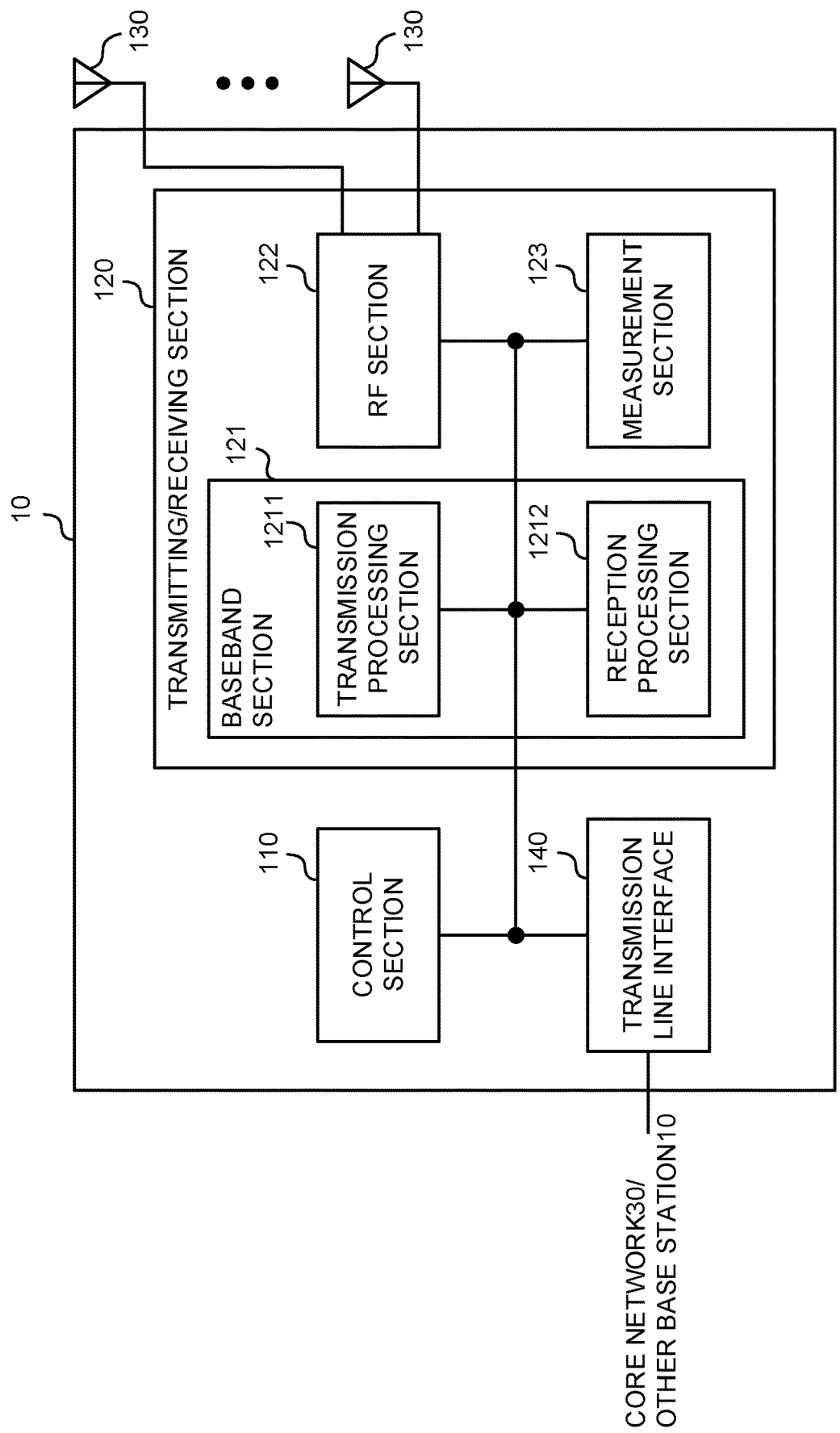
FIG. 10 is a diagram illustrating an example of a configuration of a base station according to the embodiment.

FIG. 10 is a diagram illustrating an example of a configuration of a base station according to the embodiment. The base station 10 includes a control section 110, a transmitting/receiving section 120, a transmission/reception antenna 130, and a transmission line interface 140. Note that, one or more each of the control sections 110, the transmitting/receiving sections 120, the transmission/reception antennas 130, and the transmission line interfaces 140 may be included.

Note that, although this example mainly describes functional blocks of a characteristic part of the present embodiment, it may be assumed that the base station 10 includes other functional blocks that are necessary for radio communication as well. A part of processing of each section described below may be omitted.

The control section 110 controls the entire base station 10. The control section 110 can include a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data, control information, a sequence, and the like to be transmitted as signals, and transfer the data, control information, sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be formed as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform Packet Data Convergence Protocol (PDCP) layer processing, Radio Link Control (RLC) layer processing (for example, RLC retransmission control), Medium Access Control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, Discrete Fourier Transform (DFT) processing (if necessary), Inverse Fast Fourier Transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, to transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), or a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus, another base station 10, or the like included in the core network 30, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

The transmitting/receiving section 120 may transmit information indicating a spatial relation between the reference reference signal (RS) and the uplink (UL) target RS with respect to the UL transmission configuration indication (TCI) state. The transmitting/receiving section 120 may receive the UL target RS and the UL channel to which the TCI state is applied, based on the information (first embodiment).

The transmitting/receiving section 120 may transmit information indicating the spatial relation between the reference reference signal (RS) and the target RS with respect to the uplink (UL) and downlink (DL) transmission configuration indication (TCI) states. The control section 110 may control transmission of the DL channel and reception of the UL channel to which the TCI state is applied (second embodiment).

(User Terminal)

Figure 11:
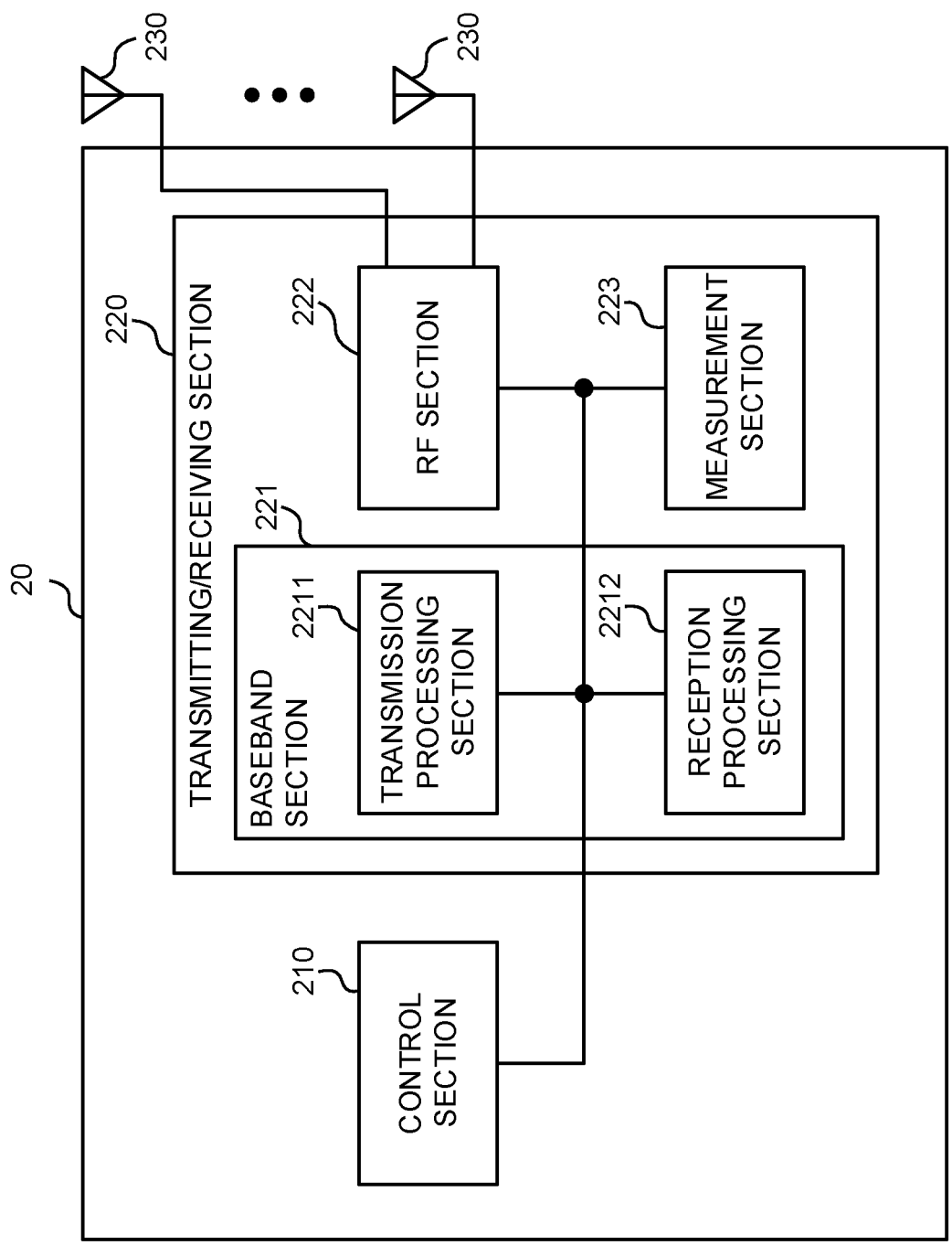
FIG. 11 is a diagram illustrating an example of a configuration of a user terminal according to the embodiment.

FIG. 11 is a diagram illustrating an example of a configuration of user terminal according to the embodiment. The user terminal 20 includes a control section 210, a transmitting/receiving section 220, and a transmission/reception antenna 230. Note that, one or more each of the control sections 210, the transmitting/receiving sections 220, and the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data, control information, a sequence, and the like to be transmitted as signals, and may transfer the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that, whether or not to apply DFT processing may be based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) may not perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that, the transmitting section and the receiving section of the user terminal 20 in the present disclosure may include at least one of the transmitting/receiving section 220 and the transmission/reception antenna 230.

The transmitting/receiving section 220 may receive information indicating a spatial relation between the reference reference signal (RS) and the uplink (UL) target RS with respect to the UL transmission configuration indication (TCI) state. The control section 210 may controls to apply the TCI state to the UL channel and the UL target RS based on the information (first embodiment).

The control section 210 may control to apply the TCI state to a plurality of the UL channels and the UL target RS in common base on the information (first embodiment).

The control section 210 may control to apply the TCI state independently for each of the plurality of UL channels and the UL target RS base on the information (first embodiment).

The transmitting/receiving section 220 may receive information indicating a spatial relation between a reference reference signal (RS) and a target RS with respect to the uplink (UL) and downlink (DL) transmission configuration indication (TCI) states. The control section 210 may control to apply the TCI state to the UL channel and the target RS based on the information (second embodiment).

The control section 210 may control to apply the TCI state to a plurality of the UL channels and the target RS in common based on the information (second embodiment).

The control section 210 may control to apply the TCI state independently for each of the plurality of UL channels and the target RS based on the information (second embodiment).

The control section 210 may control to apply a specific quasi-co-location type to an index regarding the information with respect to the UL TCI state and an index regarding the information with respect to the DL TCI state (second embodiment).

(Hardware Configuration)

Note that, the block diagrams that have been used to describe the above embodiments illustrate blocks of functional units. These functional blocks (configuration sections) may be implemented by an arbitrary combination of at least one of hardware or software. Furthermore, an implementation method for each functional block is not particularly limited. That is, each functional block may be implemented by using one apparatus physically or logically coupled, or may be implemented by directly or indirectly connecting two or more physically or logically separate apparatuses (by using wire, radio, or the like, for example) and using these plural apparatuses. The functional block may be implemented by combining the one or the plural apparatuses with software.

Here, functions include, but are not limited to, determining, determining, judging, computing, calculating, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning. For example, a functional block (configuration section) that causes transmission to function may be referred to as a transmitting unit, a transmitter, and the like. In any case, as described above, the implementation method is not particularly limited.

Figure 12:
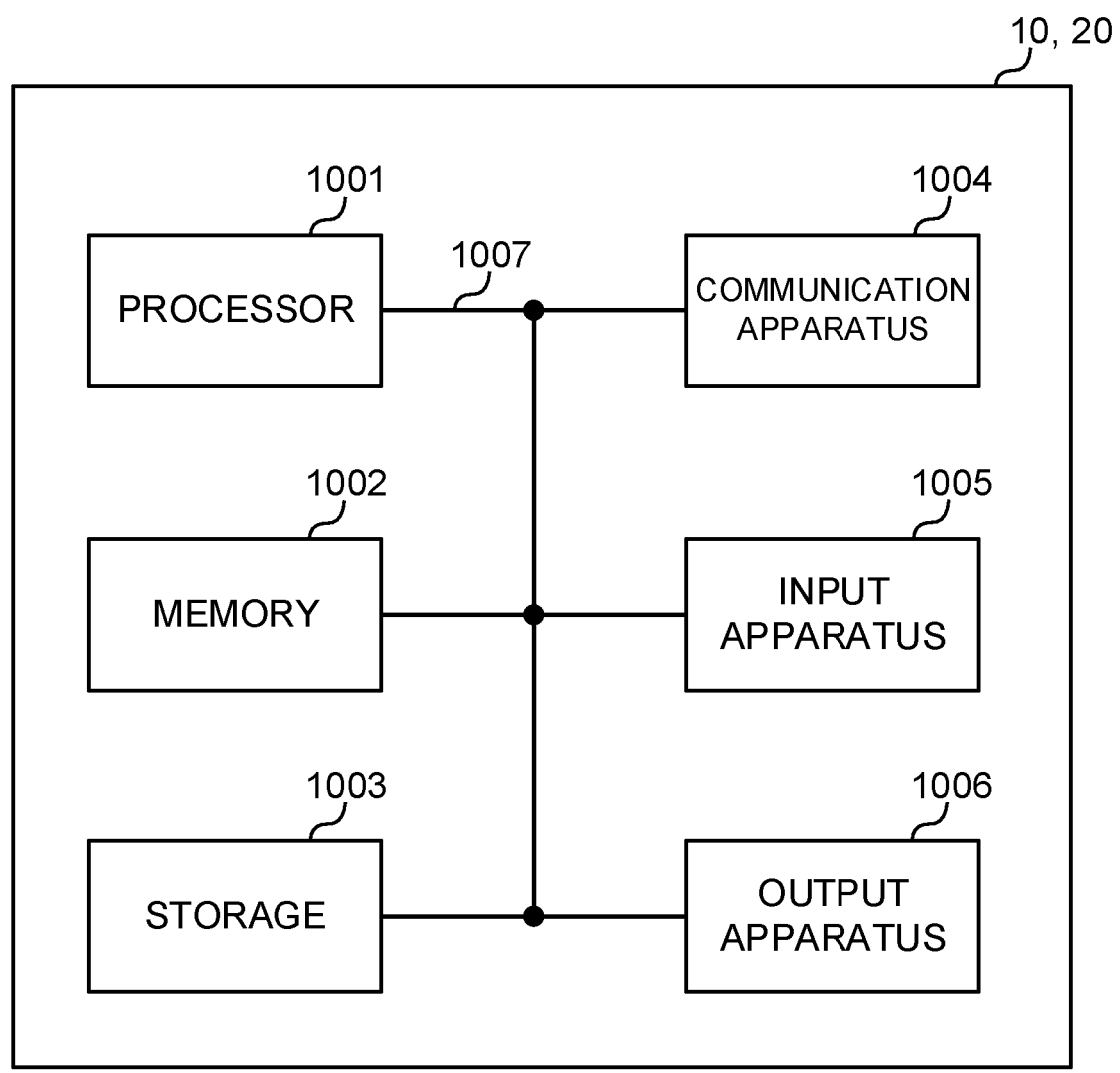
FIG. 12 is a diagram illustrating an example of a hardware configuration of a base station and a user terminal according to the embodiment.

For example, the base station, the user terminal, and the like according to the embodiment of the present disclosure may function as a computer that executes the processing of the radio communication method of the present disclosure. FIG. 12 is a diagram illustrating an example of a hardware configuration of the base station and the user terminal according to the embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that, in the present disclosure, the terms such as an apparatus, a circuit, a device, a section, or a unit can be replaced with each other. The hardware configuration of the base station 10 and the user terminal 20 may be configured including one or a plurality of the apparatuses illustrated in the drawings, or may be configured without including some apparatuses.

For example, although only one processor 1001 is illustrated, there may be a plurality of processors. Furthermore, the processing may be executed by one processor, or the processing may be executed by two or more processors simultaneously, sequentially, or using other techniques. Note that, the processor 1001 may be implemented with one or more chips.

For example, each function of the base station 10 and user terminal 20 is implemented by causing predetermined software (program) to be read onto hardware such as the processor 1001 and the memory 1002, and by the processor 1001 performing arithmetic operation to control communication via the communication apparatus 1004 and control at least one of reading or writing of data in the memory 1002 and storage 1003.

The processor 1001 operates an operating system to control an entire computer, for example. The processor 1001 may include a central processing unit (CPU) including: an interface with peripheral equipment; a control device; an arithmetic device; a register; and the like. For example, at least a part of the above-described control section 110 (210), transmitting/receiving section 120 (220), and the like may be implemented by the processor 1001.

Furthermore, the processor 1001 reads a program (program code), a software module, data, and the like from at least one of the storage 1003 or the communication apparatus 1004 into the memory 1002, and executes various types of processing in accordance with these. As the program, a program is used that causes a computer to execute at least a part of the operation described in the above-described embodiment. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a register, a cache, a main memory (main storage apparatus), and the like. The memory 1002 may store a program (program code), a software module, and the like executable for implementing the radio communication method according to the embodiment of the present disclosure.

The storage 1003 is a computer-readable recording medium, and may include, for example, at least one of a flexible disk, a floppy (registered trademark) disk, a magneto-optical disk (for example, a compact disc (compact disc ROM (CD-ROM) and the like), a digital versatile disc, and a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication via at least one of a wired network or a radio network, and is also referred to as a network device, a network controller, a network card, a communication module, and the like, for example. The communication apparatus 1004 may include a high frequency switch, a duplexer, a filter, a frequency synthesizer, and the like to implement, for example, at least one of Frequency Division Duplex (FDD) or Time Division Duplex (TDD). For example, the transmitting/receiving section 120 (220), the transmission/reception antenna 130 (230), and the like described above may be implemented by the communication apparatus 1004. The transmitting/receiving section 120 (220) may be implemented by being physically or logically separated into the transmitting section 120a (220a) and the receiving section 120b (220b).

The input apparatus 1005 is an input device that receives an input from outside (for example, a keyboard, a mouse, a microphone, a switch, a button, a sensor, and the like). The output apparatus 1006 is an output device for performing output to the outside (for example, a display, a speaker, a Light Emitting Diode (LED) lamp, and the like). Note that, the input apparatus 1005 and output apparatus 1006 may have an integrated form (for example, a touch panel).

Furthermore, apparatuses such as the processor 1001 and the memory 1002 are connected to each other by the bus 1007 for communicating information. The bus 1007 may be formed by using a single bus, or may be formed by using different buses for respective connections between apparatuses.

Furthermore, the base station 10 and user terminal 20 may include hardware such as a microprocessor, a Digital Signal Processor (DSP), an Application Specific Integrated Circuit (ASIC), a Programmable Logic Device (PLD), or a Field Programmable Gate Array (FPGA), and some or all of the functional blocks may be implemented by using the hardware. For example, the processor 1001 may be implemented by using at least one of these pieces of hardware.

(Variations)

Note that, terms described in the present disclosure and terms necessary for understanding the present disclosure may be replaced with other terms that have the same or similar meanings. For example, a channel, a symbol, and a signal (or signaling) may be replaced with each other. Furthermore, the signal may be a message. A reference signal can be abbreviated as an RS, and may be referred to as a pilot, a pilot signal, and the like, depending on the standard applied. Furthermore, a Component Carrier (CC) may be referred to as a cell, a frequency carrier, a carrier frequency, and the like.

A radio frame may include one or a plurality of periods (frames) in a time domain. Each of one or a plurality of periods (frames) constituting a radio frame may be referred to as a subframe. Moreover, the subframe may include one or a plurality of slots in the time domain. The subframe may have a fixed time length (for example, 1 ms) that does not depend on numerology.

Here, the numerology may be a communication parameter applied to at least one of transmission and reception of a certain signal or channel. For example, the numerology may indicate at least one of Subcarrier Spacing (SCS), a bandwidth, a symbol length, a cyclic prefix length, a Transmission Time Interval (TTI), the number of symbols per TTI, a radio frame configuration, specific filtering processing to be performed by a transceiver in a frequency domain, specific windowing processing to be performed by the transceiver in the time domain, and the like.

A slot may include one or a plurality of symbols (Orthogonal Frequency Division Multiplexing (OFDM) symbols, Single Carrier Frequency Division Multiple Access (SC-FDMA) symbols, and the like) in the time domain. Furthermore, the slot may be a time unit based on the numerology.

The slot may include a plurality of mini slots. Each mini slot may include one or a plurality of symbols in the time domain. Furthermore, a mini slot may be referred to as a sub-slot. Each mini slot may include fewer symbols than a slot. A PDSCH (or PUSCH) transmitted in a time unit larger than a mini slot may be referred to as a PDSCH (PUSCH) mapping type A. A PDSCH (or PUSCH) transmitted using the mini slot may be referred to as a PDSCH (PUSCH) mapping type B.

The radio frame, subframe, slot, mini slot, and symbol all represent a time unit when transmitting a signal. Another name may be used corresponding to each of the radio frame, subframe, slot, mini slot, and symbol. Note that, the time units such as the frame, subframe, slot, mini slot, and symbol in the present disclosure may be replaced with each other.

For example, one subframe may be referred to as a TTI, a plurality of consecutive subframes may be referred to as a TTI, or one slot or one mini slot may be referred to as a TTI. That is, at least one of the subframe and TTI may be a subframe (1 ms) in the existing LTE, may be a period shorter than 1 ms (for example, one to thirteen symbols), or may be a period longer than 1 ms. Note that, the unit indicating the TTI may be referred to as the slot, mini slot, and the like instead of the subframe.

Here, the TTI refers to, for example, the minimum time unit of scheduling in the radio communication. For example, in LTE systems, the base station performs scheduling for allocating the radio resources (such as the frequency bandwidth and transmission power that can be used in each user terminal) to each user terminal in TTI units. Note that, definition of the TTI is not limited to this.

The TTI may be a transmission time unit of channel coded data packet (transport block), code block, codeword, and the like, or may be a processing unit of scheduling, link adaptation, and the like. Note that, when the TTI is given, a time interval (for example, the number of symbols) to which the transport block, code block, codeword, and the like are actually mapped may be shorter than the TTI.

Note that, when one slot or one mini slot is referred to as the TTI, one or more TTIs (that is, one or more slots or one or more mini slots) may be the minimum time unit of scheduling. Furthermore, the number of slots (the number of mini slots) forming the minimum time unit of the scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a sub-slot, a slot, and the like.

Note that, the long TTI (for example, the usual TTI, subframe, and the like) may be replaced with a TTI having a time length longer than 1 ms, and the short TTI (for example, the shortened TTI and the like) may be replaced with a TTI having a TTI length shorter than the TTI length of the long TTI and not shorter than 1 ms.

A Resource Block (RB) is a resource allocation unit of the time domain and frequency domain, and may include one or a plurality of consecutive subcarriers in the frequency domain. The number of subcarriers included in the RB may be the same regardless of the numerology, and may be 12, for example. The number of subcarriers included in the RB may be determined based on the numerology.

Furthermore, the RB may include one or a plurality of symbols in the time domain, and have the length of one slot, one mini slot, one subframe, or one TTI. One TTI, one subframe, and the like may include one or a plurality of resource blocks.

Note that, one or a plurality of RBs may be referred to as a physical resource block (physical RB (PRB)), a Sub-Carrier Group (SCG), a Resource Element Group (REG), a PRB pair, an RB pair, and the like.

Furthermore, the resource block may include one or a plurality of Resource Elements (REs). For example, one RE may be a radio resource domain of one subcarrier and one symbol.

A Bandwidth Part (BWP) (which may be referred to as partial bandwidth and the like) may represent a subset of consecutive common resource blocks (RBs) for certain numerology in a certain carrier. Here, the common RB may be specified by an index of the RB based on a common reference point of the carrier. The PRB may be defined in a certain BWP and numbered within the BWP.

The BWP may include the UL BWP (BWP for UL) and the DL BWP (BWP for DL). For the UE, one or a plurality of BWPs may be configured within one carrier.

At least one of the configured BWPs may be active, and it is not necessary to assume that the UE transmits and receives a predetermined signal/channel outside the active BWP. Note that, a cell, a carrier, and the like in the present disclosure may be replaced with a BWP.

Note that, the structures of the radio frame, subframe, slot, mini slot, symbol, and the like described above are merely examples. For example, configurations may be variously changed, such as the number of subframes included in the radio frame, the number of slots per subframe or radio frame, the number of mini slots included in the slot, the number of symbols and RBs included in the slot or mini slot, the number of subcarriers included in the RB, and the number of symbols, the symbol length, and cyclic prefix (CP) length in the TTI.

Furthermore, the information and parameters described in the present disclosure may be represented in absolute values, represented in relative values with respect to predetermined values, or represented using other corresponding information. For example, the radio resource may be indicated by a predetermined index.

The names used for the parameters and the like in the present disclosure are not limited names in any respect. Moreover, an equation and the like using these parameters may differ from those explicitly disclosed in the present disclosure. Since various channels (PUCCH, PDCCH, and the like) and information elements may be identified by any suitable names, the various names allocated to these various channels and information elements are not limited names in any respect.

The information, signals, and the like described in the present disclosure may be represented using any of various different technologies. For example, the data, instruction, command, information, signal, bit, symbol, chip, and the like that may be referred to throughout the above description may be represented by the voltage, current, electromagnetic wave, magnetic field or magnetic particle, optical field or photon, or any combination thereof.

Furthermore, the information, signals, and the like may be output in at least one of a direction from a higher layer to a lower layer and a direction from the lower layer to the higher layer. The information, signals, and the like may be input and output via a plurality of network nodes.

The information, signals, and the like that are input and output may be stored in a specific location (for example, in a memory), or may be managed using a management table. The information, signals, and the like to be input and output can be overwritten, updated, or appended. The information, signals, and the like that are output may be deleted. The information, signals, and the like that are input may be transmitted to other apparatuses.

The notification of information may be performed using other methods without being limited to the aspects/embodiments described in the present disclosure. For example, the notification of information in the present disclosure may be performed by using physical layer signaling (for example, Downlink Control Information (DCI), Uplink Control Information (UCI)), higher layer signaling (for example, Radio Resource Control (RRC) signaling, broadcast information (Master Information Block (MIB), System Information Block (SIB), or the like), Medium Access Control (MAC) signaling), and another signal, or a combination thereof.

Note that, the physical layer signaling may be referred to as Layer 1/Layer 2 (L1/L2) control information (L1/L2 control signal), L1 control information (L1 control signal), and the like. Furthermore, the RRC signaling may be referred to as an RRC message, and may be, for example, an RRC Connection Setup message, an RRC Connection Reconfiguration message, and the like. Furthermore, notification of the MAC signaling may be given by using, for example, a MAC Control Element (MAC CE).

Furthermore, notification of predetermined information (for example, notification of "being X") does not necessarily have to be explicit, and may be given implicitly (for example, by not giving notification of the predetermined information or by notification of other information).

Judging may be performed by a one-bit value (0 or 1), by a boolean indicated by true or false, or by comparison of numerical values (for example, comparison with a predetermined value).

Regardless of whether software is referred to as software, firmware, middleware, microcode, or hardware description language, or referred to by other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Furthermore, the software, instruction, information, and the like may be transmitted and received via transmission media. For example, when software is transmitted from a website, a server, or other remote sources by using at least one of wired technology (coaxial cable, optical fiber cable, twisted-pair, Digital Subscriber Line (DSL), and the like) or radio technology (infrared radiation, microwave, and the like), at least one of the wired technology or the radio technology is included in the definition of transmission media.

The terms "system" and "network" used in the present disclosure may be used interchangeably. The "network" may mean an apparatus (for example, a base station) included in the network.

In the present disclosure, the terms such as "precoding", "precoder", "weight (precoding weight)", "Quasi-Co-Location (QCL)", "Transmission Configuration Indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" may be used interchangeably.

In the present disclosure, the terms such as "Base Station (BS)", "radio base station", "fixed station", "NodeB", "eNodeB (eNB)", "gNodeB (gNB)", "access point", "Transmission Point (TP)", "Reception Point (RP)", "Transmission/Reception Point (TRP)", "panel", "cell", "sector", "cell group", "carrier", and "component carrier" may be used interchangeably. The base station may also be referred to by a term such as a macro cell, a small cell, a femto cell, a pico cell and the like.

The base station may accommodate one or a plurality of (for example, three) cells. When a base station accommodates a plurality of cells, the entire coverage area of the base station can be partitioned into multiple smaller areas, and a communication service can also be provided for each smaller area through base station subsystems (for example, indoor small base stations (Remote Radio Heads (RRHs))). The term "cell" or "sector" refers to all or part of the coverage area of at least one of the base station or base station subsystem that provides the communication service within this coverage.

In the present disclosure, the terms "Mobile Station (MS)", "user terminal", "User Equipment (UE)", "terminal", and the like may be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or mobile station may be referred to as a transmission apparatus, a reception apparatus, a radio communication apparatus, and the like. Note that, at least one of the base station or mobile station may be a device mounted on a mobile body, a mobile body itself, and the like. The mobile body may be a transportation (for example, a car, an airplane, and the like), an unmanned mobile body (for example, a drone, an autonomous car, and the like), or a (manned or unmanned) robot. Note that, at least one of the base station or the mobile station also includes an apparatus that does not necessarily move during a communication operation. For example, at least one of the base station or mobile station may be an Internet of Things (IoT) device such as a sensor.

Furthermore, the base station in the present disclosure may be replaced with the user terminal. For example, each aspect/embodiment of the present disclosure may be applied to a configuration in which communication between the base station and the user terminal is replaced with communication between a plurality of user terminals (which may be referred to as, for example, Device-to-Device (D2D), Vehicle-to-Everything (V2X), and the like). In this case, the user terminal 20 may have the function of the base station 10 described above. Furthermore, the terms such as "up" and "down" may be replaced with the term corresponding to the terminal-to-terminal communication (for example, "side"). For example, an uplink channel, a downlink channel, and the like may be replaced with a side channel.

Similarly, the user terminal in the present disclosure may be replaced with a base station. In this case, the base station 10 may have the function of the user terminal 20 described above.

Certain operations described in the present disclosure to be performed by the base station may, in some cases, be performed by their upper nodes. In a network including one or a plurality of network nodes including the base station, it is clear that various operations performed to communicate with terminals may be performed by the base station, one or a plurality of network nodes other than the base station (for example, Mobility Management Entity (MME), Serving-Gateway (S-GW), and the like are conceivable, but there is no limitation), or a combination thereof.

Each aspect/embodiment described in the present disclosure may be used alone, used in a combination, and switched in association with execution. Furthermore, the order of the processing procedures, sequences, flowcharts, and the like of each aspect/embodiment described in the present disclosure may be changed as long as there is no contradiction. For example, regarding the method described in the present disclosure, elements of various steps are presented using an exemplary order, and the order is not limited to the presented specific order.

Each aspect/embodiment described in the present disclosure may be applied to a system using Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), New Radio (NR), New radio access (NX), Future generation radio access (FX), Global System For Mobile Communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), other appropriate radio communication methods, and a next generation system extended based on these. Furthermore, a plurality of systems may be combined to be applied (for example, a combination of LTE or LTE-A and 5G).

The term "based on" used in the present disclosure does not mean "only based on" unless otherwise specified. In other words, the term "based on" means both "only based on" and "at least based on".

Reference to elements with designations such as "first", "second", and the like used in the present disclosure does not generally limit the quantity or order of those elements. These designations may be used in the present disclosure as a convenient method of distinguishing between two or more elements. Thus, the reference to the first and second elements does not mean that only two elements may be adopted, or that the first element must precede the second element in a certain manner.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Furthermore, "determining" may be regarded as "determining" of receiving (for example, receiving of information), transmitting (for example, transmitting of information), input, output, accessing (for example, accessing to data in a memory), and the like.

Furthermore, "determining" may be regarded as "determining" of resolving, selecting, choosing, establishing, comparing, and the like. In other words, "determining" may be regarded as "determining" of a certain operation.

Furthermore, "determining" may be replaced with "assuming", "expecting", "considering", and the like.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency region, microwave region, or optical (both visible and invisible) region, or the like.

In the present disclosure, the terms "A and B are different" may mean "A and B are different from each other". Note that, the terms may mean that "A and B are each different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be implemented as a corrected and modified mode without departing from the spirit and scope of the invention defined based on the description of the claims. Thus, the description of the present disclosure is provided for the purpose of exemplification and explanation, and has no limitative meaning to the invention according to the present disclosure.

The invention claimed is:
1. A terminal comprising:
 a receiver that receives information regarding a transmission configuration indication (TCI) state common to uplink (UL) and downlink (DL); and a processor that, when the information regarding the TCI state common to UL and DL is activated for a physical downlink control channel (PDCCH), a physical downlink shared channel (PDSCH), a channel state information reference signal (CSI-RS), a physical uplink control channel (PUCCH), a physical uplink shared channel (PUSCH), and a sounding reference signal (SRS) by radio resource control (RRC) signaling and a medium access control control element (MAC CE), controls to apply the TCI state common to UL and DL to the PDCCH, the PDSCH, the CSI-RS, the PUCCH, the PUSCH, and the SRS.

2. A radio communication method for a terminal, comprising:

receiving information regarding a transmission configuration indication (TCI) state common to uplink (UL) and downlink (DL); and when the information regarding the TCI state common to UL and DL is activated for a physical downlink control channel (PDCCH), a physical downlink shared channel (PDSCH), a channel state information reference signal (CSI-RS), a physical uplink control channel (PUCCH), a physical uplink shared channel (PUSCH), and a sounding reference signal (SRS) by radio resource control (RRC) signaling and a medium access control control element (MAC CE), controlling to apply the TCI state common to UL and DL to the PDCCH, the PDSCH, the CSI-RS, the PUCCH, the PUSCH, and the SRS.

3. A base station comprising:

a transmitter that transmits information regarding a transmission configuration indication (TCI) state common to uplink (UL) and downlink (DL); and a processor that, when the information regarding the TCI state common to UL and DL is activated for a physical downlink control channel (PDCCH), a physical downlink shared channel (PDSCH), a channel state information reference signal (CSI-RS), a physical uplink control channel (PUCCH), a physical uplink shared channel (PUSCH), and a sounding reference signal (SRS) by radio resource control (RRC) signaling and a medium access control control element (MAC CE), controls to apply the TCI state common to UL and DL to the PDCCH, the PDSCH, the CSI-RS, the PUCCH, the PUSCH, and the SRS.

4. A system comprising a terminal and a base station, wherein the terminal comprises:

a receiver that receives information regarding a transmission configuration indication (TCI) state common to uplink (UL) and downlink (DL); and a processor that, when the information regarding the TCI state common to UL and DL is activated for a physical downlink control channel (PDCCH), a physical downlink shared channel (PDSCH), a channel state information reference signal (CSI-RS), a physical uplink control channel (PUCCH), a physical uplink shared channel (PUSCH), and a sounding reference signal (SRS) by radio resource control (RRC) signaling and a medium access control control element (MAC CE), controls to apply the TCI state common to UL and DL to the PDCCH, the PDSCH, the CSI-RS, the PUCCH, the PUSCH, and the SRS, and the base station comprises:

a transmitter that transmits the information.

* * * * *